US007701110B2

(12) United States Patent
Fukuda et al.

(10) Patent No.: US 7,701,110 B2
(45) Date of Patent: Apr. 20, 2010

(54) ULTRASONIC TRANSDUCER AND MANUFACTURING METHOD THEREOF

(75) Inventors: Hiroshi Fukuda, Tokyo (JP); Shuntaro Machida, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 802 days.

(21) Appl. No.: 11/498,872

(22) Filed: Aug. 4, 2006

(65) Prior Publication Data

US 2007/0057600 A1 Mar. 15, 2007

(30) Foreign Application Priority Data

Sep. 9, 2005 (JP) ............................ 2005-261879

(51) Int. Cl.
*H02N 1/00* (2006.01)

(52) U.S. Cl. ..................................................... 310/309

(58) Field of Classification Search ................. 310/309, 310/324

See application file for complete search history.

(56) References Cited

U.S. PATENT DOCUMENTS

| | | | | |
|---|---|---|---|---|
| 5,375,033 | A * | 12/1994 | MacDonald | 361/281 |
| 6,426,582 | B1 | 7/2002 | Niederer et al. | |
| 6,812,617 | B2 * | 11/2004 | Ives | 310/309 |
| 7,199,501 | B2 * | 4/2007 | Pei et al. | 310/311 |
| 7,265,477 | B2 * | 9/2007 | Wan | 310/309 |
| 2003/0076006 | A1 * | 4/2003 | Suzuki | 310/309 |
| 2003/0197445 | A1 * | 10/2003 | Ives | 310/309 |

* cited by examiner

*Primary Examiner*—Mark Budd
(74) *Attorney, Agent, or Firm*—Antonelli, Terry, Stout & Kraus, LLP.

(57) ABSTRACT

A technique capable of obtaining an ultrasonic transducer at high sensitivity in which a plurality of ultrasonic oscillators M1 each comprising a lower electrode fixed above a substrate, a diaphragm opposed to the substrate with a cavity being put therebetween, and an upper electrode disposed to the diaphragm are arranged above one identical substrate to constitute an ultrasonic transducer and a concentric convex corrugated region having a center identical with the center for the diaphragm is disposed to the diaphragm in an outer side of the cavity exceeding 70% for the radius thereof.

12 Claims, 13 Drawing Sheets

ULTRASONIC TRANSDUCER AND MANUFACTURING METHOD THEREOF

CLAIMS OF PRIORITY

The present application claims priority from Japanese application JP 2005-261879 filed on Sep. 9, 2005, the content of which is hereby incorporated by reference into this application.

FIELD OF THE INVENTION

The present invention concerns an MEMS (Micro Electro Mechanical System) technology and, more in particular, it relates to a technique which is effective when applied to ultrasonic transducers and manufacture thereof as one of applications of the MEMS technology.

BACKGROUND OF THE INVENTION

The MEMS technology of forming micro-mechanical parts or mechanical systems by using fine fabrication technique which has realized high performance and high degree of integration in semiconductor integrated circuits has attracted attention. While mechanical sensors for measuring physical quantity such as pressure and acceleration or mechanical actuators such as micro switches or oscillators by using the MEMS technique have already been put to practical use, it has further been discussed around the presentation of subjects to be solved and specific measures for proceeding research and development as the technique of adding values to products in various fields.

The MEMS technique is generally classified into a bulk MEMS technique of fabricating a silicon substrate per se and a surface MEMS technique of forming products by repeating thin film deposition and patterning above the surface of silicon substrates. The surface MEMS technique is more similar to the production process of semiconductor integrated circuits and applied, for example, to ultrasonic transducers (refer, for example, to the specification of U.S. Pat. No. 6,426,582B1).

SUMMARY OF THE INVENTION

A basic structure of an ultrasonic oscillator constituting an ultrasonic transistor includes a substrate, a cavity formed above a substrate and a diaphragm provided further above the cavity in which a capacitor is formed with upper and lower electrodes putting the cavity therebetween. The ultrasonic transducer is usually constituted by arranging a plurality of ultrasonic oscillators in an array on one identical substrate. For example, diaphragms each of 50 μm diameter arranged by several tens in the longitudinal direction and by several pieces in the lateral direction are used as one pixel, and connected to common upper and lower electrodes. They are arranged in the lateral direction by the number of about 200 channels, and an AC voltage having an appropriate phase difference is applied to each of the channels converging thereby preparing a laterally converging ultrasonic wave surface. The ultrasonic wave surface is converged by providing an acoustic lens in the longitudinal direction.

However, various technical subjects described below are present for the ultrasonic transducers.

In an ultrasonic oscillator, when a DC voltage is applied to a capacitor, electrostatic force exerts between upper and lower electrodes to distort a diaphragm. However, when the DC voltage is applied, the cavity gap is smaller at the central portion and larger at the peripheral portion of a diaphragm. Accordingly, while high transmission sensitivity and receiving sensitivity can be obtained at the central portion of the diaphragm, the peripheral portion does not contributes to generation and reception of ultrasonic waves to result in a problem that no high transmission sensitivity and receiving sensitivity can be obtained for the entire ultrasonic oscillator.

Further, in an ultrasonic oscillator, a high voltage of about 100 V is required for driving and it has been desired for lowering the driving voltage by decreasing the cavity gap. By the way, in the process for manufacturing an ultrasonic oscillator, wet etching is used in a step of forming the cavity. Therefore, when a drying step is adopted after removing the etching solution, the diaphragm has been bonded to the substrate by the capillary force at the gas/liquid boundary in the drying step.

The present invention intends to provide a technique capable of obtaining an ultrasonic transducer of high sensitivity.

The invention further intends to provide a technique capable of lowering the driving voltage of an ultrasonic transducer.

The foregoing and other objects, as well as novel features of the invention will become apparent by reading the descriptions of the specification and the accompanying drawings.

Typical inventions among those disclosed in the present application, outline for are to be summarized and described as below.

The invention provides an ultrasonic transducer in which a plurality of ultrasonic oscillators each including a lower electrode fixed to a substrate, a diaphragm opposed to a substrate with a cavity put therebetween, and an upper electrode disposed to the diaphragm are arranged above one identical substrate, and the diaphragm has a concentric convex or concave corrugated region having a center identical with the center for the diaphragm in an outer side of the cavity exceeding 70% of the radius.

The invention provides a method of manufacturing an ultrasonic transducer including the steps of forming a lower electrode comprising a conductor film above a substrate, forming a first dielectric film above the lower electrode, forming a circular first sacrificial layer pattern having one or more concentric convex portions or one or more concentric concave portions above the first dielectric film, forming a circular second sacrificial layer pattern above the first sacrificial layer pattern having a center identical with the center for the first sacrificial layer pattern, forming a second dielectric film above the upper layer of the second sacrificial layer pattern, forming an upper electrode over the second dielectric film and removing the first and the second sacrificial layer patterns by a etching method.

The effects obtained by typical inventions among those disclosed in the present application are to be described below.

The transmission sensitivity and the receiving sensitivity of the ultrasonic transducer are improved and, further, since the cavity gap can be made smaller relatively, driving voltage for the ultrasonic transducer is lowered.

DETAILED DESCRIPTION OF THE PREFERRED EMBODIMENTS

Figure 1:
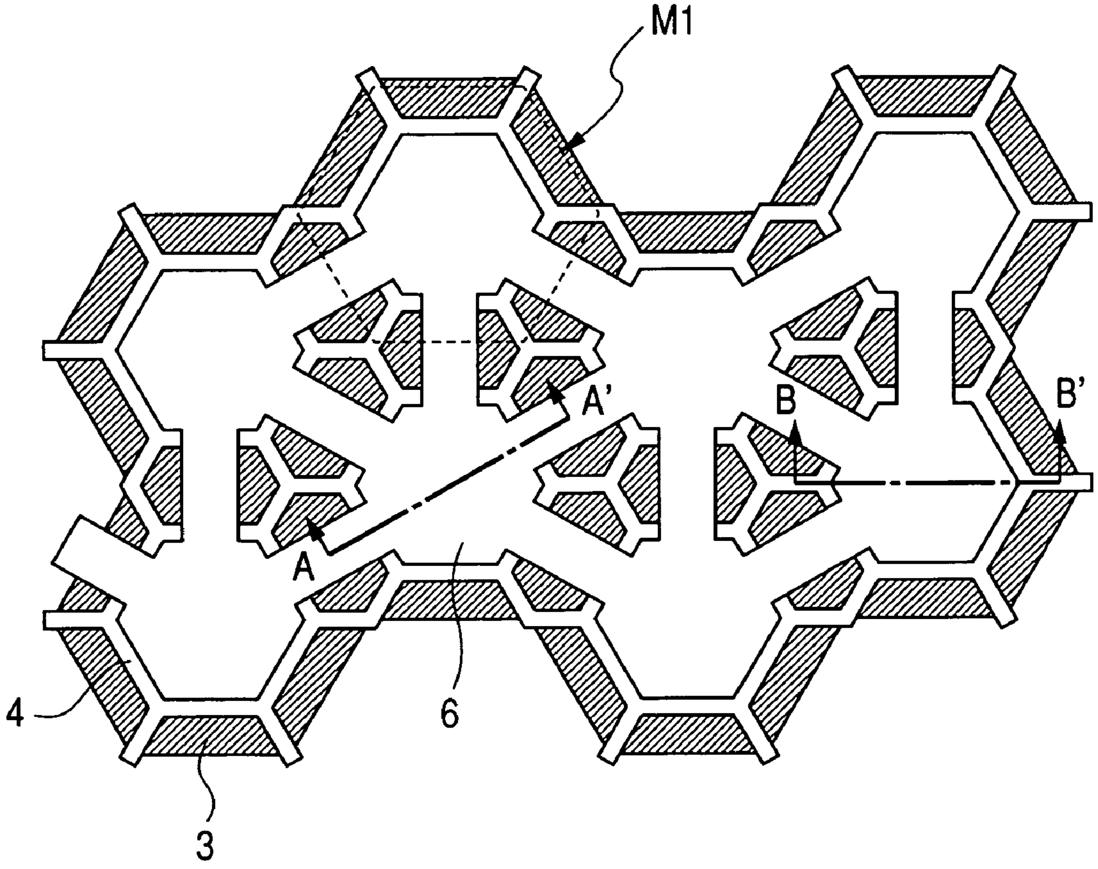
FIG. 1 is a plan view for a principal portion of an ultrasonic oscillator according to Embodiment 1 of the invention.

In this embodiment, while description has been made being divided in a plurality of sections or embodiments when such is necessary for the sake of convenience, they are not irrelevant to each other but in such a relation that one of them is a partially or entirely a modified example, details complementary explanation, etc. of others.

Further, in this embodiment, when a number of elements, etc (including number, numerical value, quantity, range, etc.) are to be referred to, they are not restricted to any particular number but may be more than or less than the specified number excepting that they are particularly specified so or apparently restricted to a particular number in view of principle. Further, it will be apparent in this embodiment that the constitutional elements (also including elemental steps, etc.) are not always essential excepting a case where they are particularly specified so, or may be considered apparently essential in view of principle. In the same manner, when shapes, positional relations, etc. of constitutional elements are to be referred to, they include those substantially approximate to or similar with the shapes, etc. excepting the case where they are particularly specified or any be considered apparently not so in view of principle This is applicable also to the numerical values and the ranges described above.

Further, in the drawings used for the embodiment, even a plan view may sometimes be hatched for the easy understanding of the drawing.

Further, throughout the drawings for explaining this embodiment, those having identical functions carry identical reference numerals in principle and duplicate descriptions therefor are to be omitted. The embodiments of the present invention are to be described specifically with reference to the drawings.

At first, a fundamental structure and a fundamental operation for an ultrasonic oscillator constituting an ultrasonic transducer studied so far by the present inventor are to be described simply since it is considered that they make the structure of the ultrasonic transducer according to the embodiment of the invention clearer.

Figure 21:
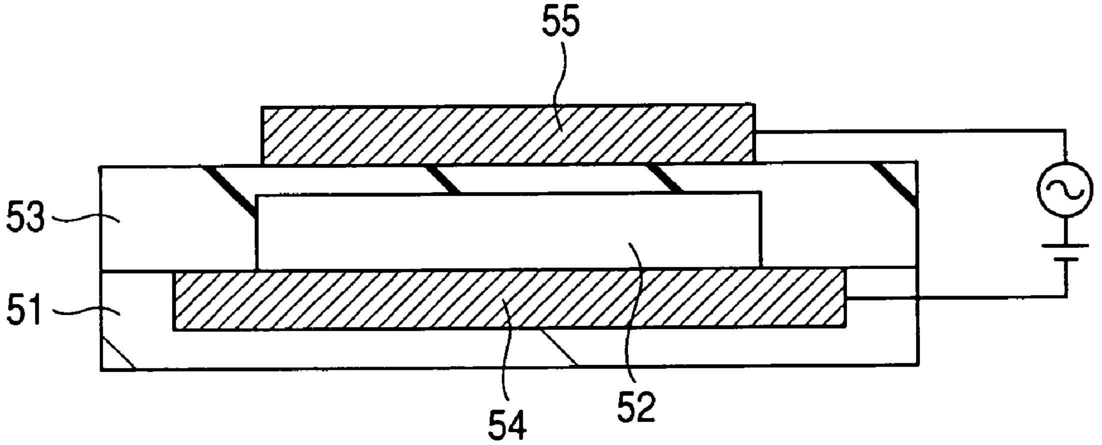
FIG. 21 is an example of a fundamental structure of an ultrasonic wave oscillator studied by the present inventor.

FIG. 21 shows an example of a fundamental structure of an ultrasonic oscillator constituting an ultrasonic transducer.

The fundamental structure of an ultrasonic oscillator includes a substrate 51, and a diaphragm 53 opposed by way of a cavity 52 to the substrate 51, a lower electrode 54 is disposed between the substrate 51 and the cavity 52, an upper electrode 55 is disposed above (or in the inside of) the diaphragm 53, and the lower electrode 54 and the upper electrode 55 constitute a capacitor. A typical radius of the cavity 52 is about 10 to 50 μm and the height of the cavity 52 is about 50 to 300 nm.

The fundamental operation of the ultrasonic oscillator is to be described. In the following description, only the one-dimensional direction perpendicular to the substrate 51 is considered, and the capacitance C and the charge amount Q are assumed as values each for unit area. When a DC voltage Vdc is applied to the capacitor, a charge amount Q of opposite polarities shown by the equation (1) is accumulated to each of the lower electrode 54 and the upper electrode 55, in which d represents a distance between the lower electrode 54 and upper electrode 55, and e represents a dielectric constant.

$$Q=C\times Vdc=(e/d)\times Vdc \qquad \text{equation (1)}$$

when an AC voltage (amplitude ±Vac) is applied being superposed on the DC voltage, the charge ΔQ shown by the equation (2) is periodically induced by the AC voltage to the lower electrode 54 and the upper electrode 55.

$$\Delta Q = C \times Fdc = (e/d) \times Vac \quad \text{equation (2)}$$

By ΔQ, an electrostatic force shown by the equation (3) changes periodically between the lower electrode 54 and the upper electrode 55.

$$F = e/d^2 \times Vdc \times Vac \quad \text{equation (3)}$$

This oscillates the diaphragm 53 to generate acoustic waves. The acoustic pressure increases as the distance between the lower electrode 54 and that electrode 55 is shorter and the DC voltage or AC voltage is higher. Further, also the transmission sensitivity and the receiving sensitivity increases as the distance between the lower electrode 54 and the upper electrode 55 is shorter and the DC voltage and the AC voltage are higher.

Embodiment 1

Figure 2A:
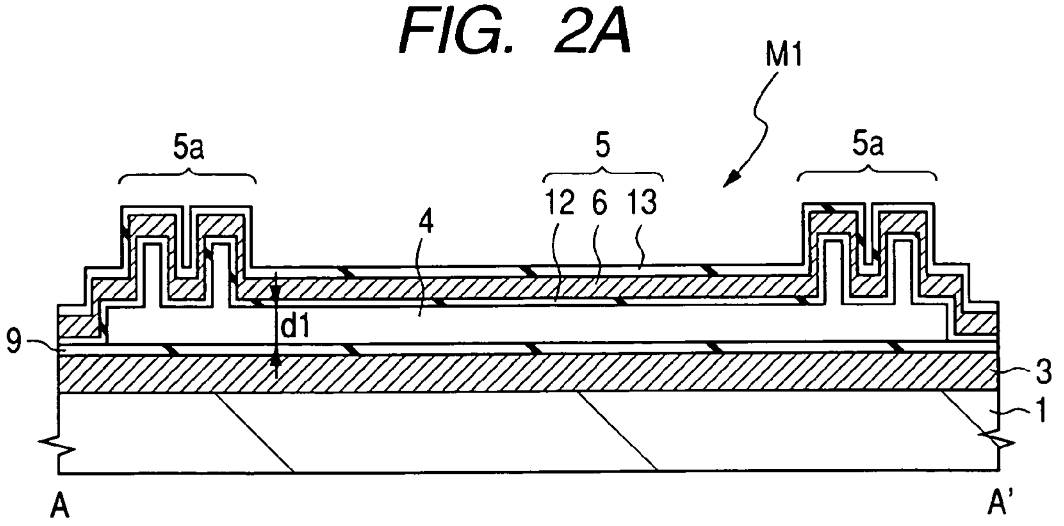
FIG. 2A, FIG. 2B, and FIG. 2C are cross sectional views for a principal portion of the ultrasonic oscillator along line A-A' in FIG. 1.
Figure 2B:
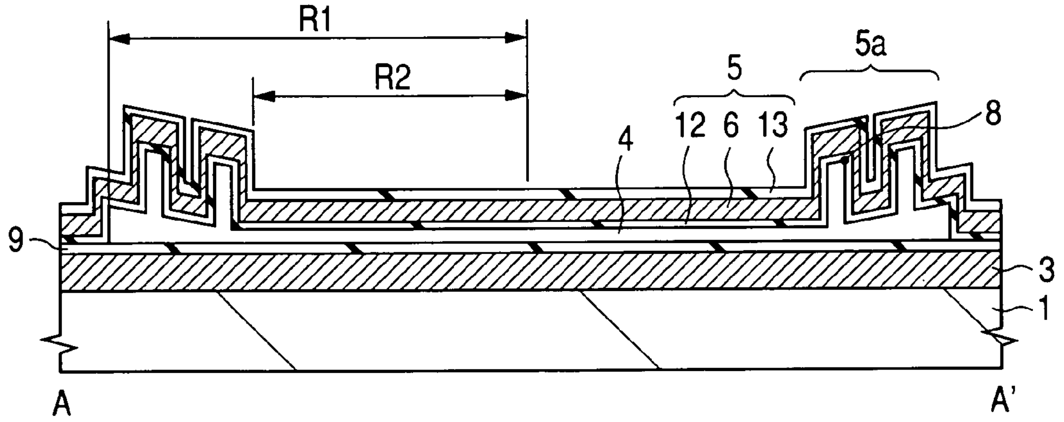

A structure and an operation of an ultrasonic oscillator constituting an ultrasonic transducer according to Embodiment 1 of the invention are to be described with reference to FIG. 1 and FIG. 2. FIG. 1 is a plan view for a principal portion of an ultrasonic oscillator according to Embodiment 1 of the invention, and FIG. 2 is a cross sectional view for a main portion of an ultrasonic oscillator along line A-A' in FIG. 1. FIG. 1 illustrates an assembling including ultrasonic oscillators by the number of 8.

On a substrate 1, a plurality of ultrasonic oscillators M1 are regularly arranged. Each of the ultrasonic oscillators M1 includes a lower electrode 3 fixed to a substrate 1, a diaphragm 5 opposed to the substrate 1 while sandwiching a cavity 4, and an upper electrode 6 disposed inside the diaphragm 5 in which the lower electrode 3 is in common with a plurality of ultrasonic oscillators M1. Further, the diaphragm 5 has a corrugated region 5*a* fabricated into a corrugated structure at the outer periphery thereof. The corrugated structure includes, for example, two concentric convex shapes having a center identical with the center for the diaphragm 5. In FIG. 2, the corrugated region 5*a* is shown being enlarged in the diametrical direction compared with the diaphragm 5 for making the ultrasonic oscillator M1 easy to see.

In a case of not applying a voltage between the lower electrode 3 and the upper electrode 6 (FIG. 2A), since no force exerts between the diaphragm 5 and the substrate 1, the diaphragm 5 is substantially in parallel with the substrate 1. In this state, a cavity gap d1 at the central portion of the diaphragm 5 (hereinafter referred to as a initial cavity gap) is substantially identical with the cavity gap at the position in the corrugated region 5*a* where the lower electrode 3 and the upper electrode 5 are nearest to each other, and it is set, for example, to 50 to 100 nm.

On the other hand, in a case of applying a DC voltage between the lower electrode 3 and the upper electrode 6 (FIG. 2B), charges of opposite polarities are induced to the lower electrode 3 and the upper electrode 6, to cause attraction between the charges on the lower electrode 3 and the charges on the upper electrode 5 opposed to each other. As a result, the diaphragm 5 is attracted to the substrate 1. However, even when the diaphragm 5 undergoes the attraction from the substrate 1, since the stress is concentrated to the corner 8 of the corrugated structure and the diaphragm 5 deforms (displaces) greatly at the corner 8, while the outer periphery of the diaphragm 5 is bent greatly, the central portion excluding the outer periphery is attracted to the substrate 1 while being kept at a relative parallelism. Thus, the cavity gap can be kept constant in a relatively large region at the central portion of the diaphragm 5. Accordingly, the area density of charges induced to the lower electrode 3 and the upper electrode 6 is uniform and the attraction exerting between the charges on the lower electrode 3 and the charges on the upper electrode 6 is also relatively constant.

The corrugated region 5*a* is preferably disposed to a region apart from the center of the diaphragm 5 radially by a predetermined distance R2 or more. The constant distance R2 can be set, for example, as: R2>0.7×R1 relative to the radius R1 of the cavity 4. That is, the corrugated region 5*a* is formed to the outer side in the cavity 4 exceeding 70% for the radius R1. Under the condition, about 50% or more of the area for the diaphragm 5 can be utilized effectively, and radius R1 of the cavity 4, for example, from 30 to 80 μm.

Figure 2C:
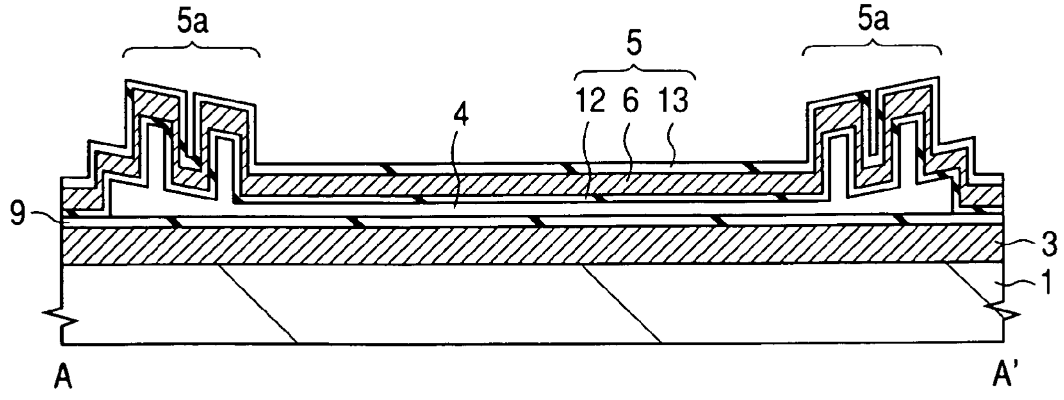

Further, in a case of applying an AC voltage being superposed on the DC voltage between the lower electrode 3 and the upper electrode 6 (FIG. 2C), the charges induced to the lower electrode 3 and the upper electrode 6 by the DC voltage increases or decreases. By the fluctuation of the force exerting between the charges on the lower electrode and the charges on the upper electrode opposed to each other, the attraction between the diaphragm 5 and the substrate 1 increases or decreased to oscillate the diaphragm 5 and generate ultrasonic waves. Since the force exerting between the charges on the lower electrode 3 and the charges on the upper electrode 6 opposed to each other is substantially in proportion with the amount of charges on the lower electrode and the upper electrode 6 and, on the other hand, since the amount of charges on the lower electrode 3 and the upper electrode 6 is in proportion with the DC voltage, the oscillation amplitude of the attraction between the diaphragm and the substrate 1 is also in proportion with the DC voltage. In a state of not attracting the diaphragm 5 to the substrate 1 by the DC voltage, the resonance frequency in the oscillation of the diaphragm 5 decreases and, in a state of attracting the diaphragm 5 to the substrate 1 by the Dc voltage, internal stress is formed in the corrugated region 5*a* to increase the resonance frequency in the oscillation of the diaphragm 5. The corrugated region 5*a* and the initial cavity gap d1 can be designed such that the desired cavity gap and the resonance frequency can be obtained under use of the DC voltage and the AC voltage. For example, the convex portion can be 1 μm and the height of the convex portion can be 1 μm on the surface of the corrugated region 5*a*. In FIG. 2, while the convex portions in the corrugated region 5*a* are formed by the number of 2, this not restricted and they may be one or three or more.

Then, a method of manufacturing the ultrasonic oscillator M1 described above is to be explained in the order of steps with reference to FIG. 3 to FIG. 9. FIG. 3 and FIG. 5 to FIG. 9 are cross sectional views for the principal portion of the ultrasonic oscillator M1 along line B-B' in FIG. 1 described above and FIG. 4 is a plan view for the a principal portion of a first sacrificial layer pastern used for the manufacture of the ultrasonic oscillator M1. In the drawings, the corrugated region 5*a* is shown being enlarged in the diametrical direction compared with the diaphragm for making the ultrasonic oscillator M1 more easy to see, and an actual corrugated region 5*a* is disposed to the outer side in the cavity 4 exceeding 70% for the radius.

Figure 3:
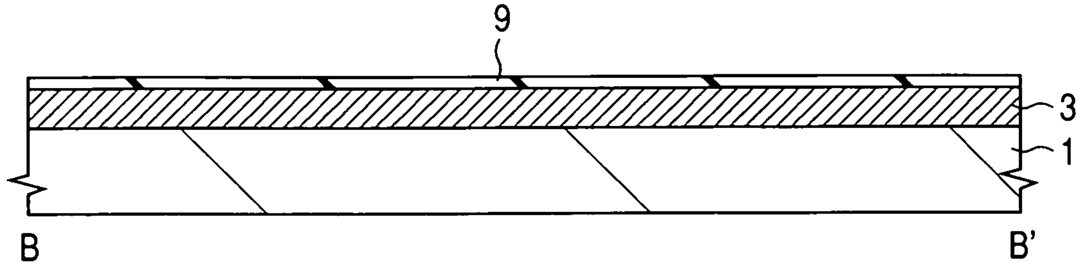
FIG. 3 is a cross sectional view of a principal portion along line B-B' in FIG. 1, showing a step of manufacturing an ultrasonic oscillator according to Embodiment 1 of the invention.

At first, as shown in FIG. 3, a conductor film, for example, a tungsten film is formed to a substrate 1 made of single crystal silicon, and the tungsten film is etched by using a resist pattern formed by a photolithographic method as the mask, to form a lower electrode 3. Successively, a first dielectric film, for example, a silicon dioxide film or a silicon nitride film is deposited over the lower electrode 3. The first dielectric film 9 is disposed for preventing the lower electrode 3 and the upper electrode 6 from being in contact with each other during operation of the ultrasonic transducer.

Figure 4:
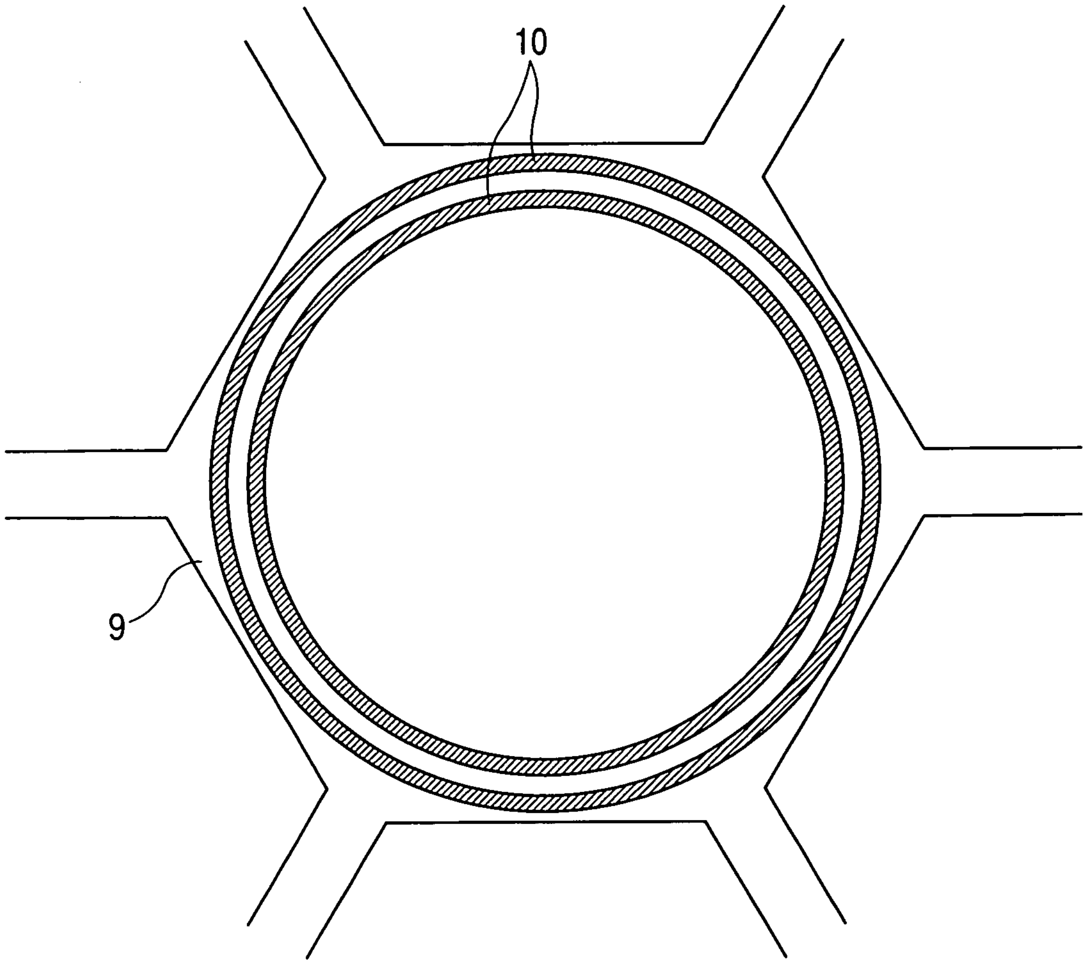
FIG. 4 is a plan view for a principal portion of a first sacrificial layer pattern according to Embodiment 1 of the invention.
Figure 5:
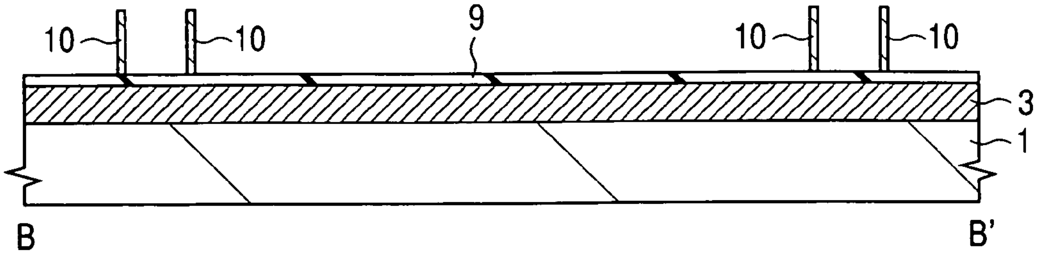
FIG. 5 is a cross sectional view for a principal portion along line B-B' in FIG. 1, showing a manufacturing step of an ultrasonic oscillator according to Embodiment 1 of the invention.

Then, as shown in FIG. 4 and FIG. 5, after depositing a first sacrificial layer, for example, a polycrystal silicon film above the first dielectric film 9 by a CVD (Chemical Vapor Deposition) method, the first sacrificial layer is etched by using a resist pattern formed by a photolithographic method as a mask to form a first sacrificial layer pattern 10 in a region to form a convex portion of a corrugated structure. While the first sacrificial layer pattern 10 is formed as a shape having a concentric convex portion, it may also be a shape, for example, along the profile of the cavity.

Figure 6:
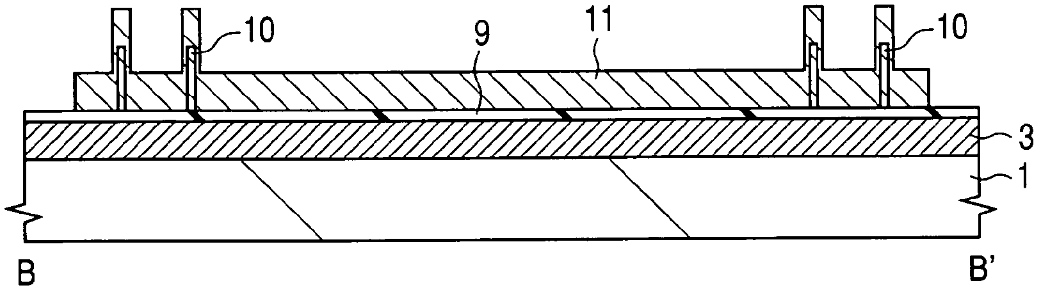
FIG. 6 is a cross sectional view for a principal portion along line B-B' in FIG. 1, showing a manufacturing step of an ultrasonic oscillator according to Embodiment 1 of the invention.

Then, as shown in FIG. 6, after depositing a second sacrificial layer, for example, a polycrystal layer above the first sacrificial layer pattern 10 by a CVD method, the second sacrificial layer is etched by using a resist pattern formed by a photolithographic method as a mask to form a second sacrificial layer pattern 11 to a region where the cavity 4 is to be formed later. The thickness of the second sacrificial layer pattern 11 is, for example, about 50 to 200 nm.

Figure 7:
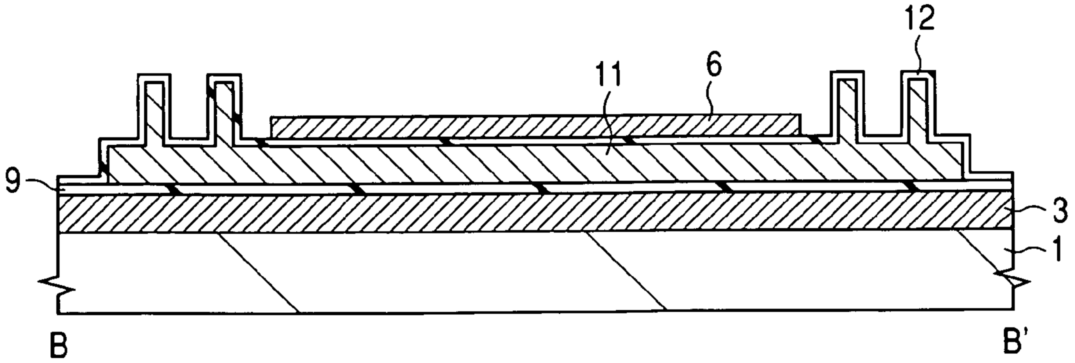
FIG. 7 is a cross sectional view for a principal portion along line B-B' in FIG. 1, showing a manufacturing step of an ultrasonic oscillator according to Embodiment 1 of the invention.

Then, as shown in FIG. 7, a second dielectric film 12, for example, a silicon dioxide film or a silicon nitride film is deposited above the second sacrificial layer pattern 11. The second dielectric film 12 is disposed in order to prevent the lower electrode 3 and the upper electrode 6 from being contact with each other during operation of the ultrasonic transducer. Successively, an aluminum film and a titanium nitride film are deposited successively over the second insulative film 12 to form a laminate film, and the laminate film was etched by using a resist pattern formed by a photolithographic method to form an upper electrode 6.

Figure 8:
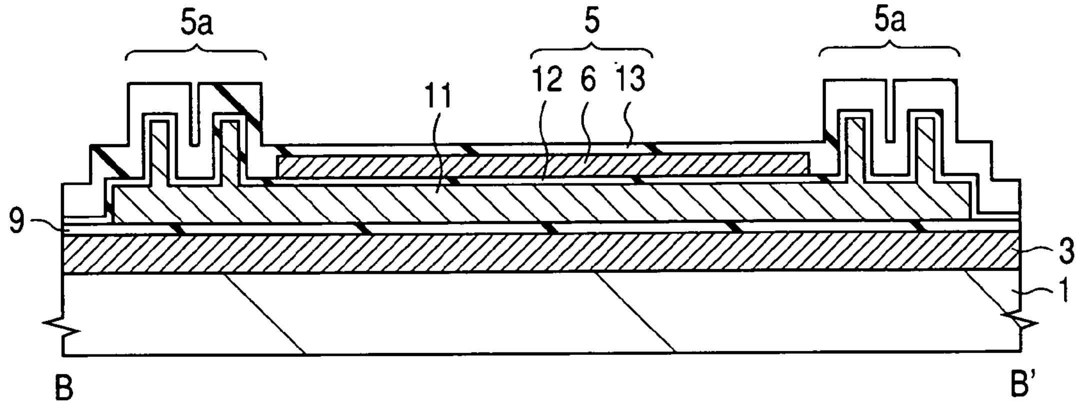
FIG. 8 is a cross sectional view for a principal portion along line B-B' in FIG. 1, showing a manufacturing step of an ultrasonic oscillator according to Embodiment 1 of the invention.

Then, as shown in FIG. 8, a silicon nitride film (or silicon dioxide film) 13 is deposited above the upper electrode 6. Thus, a diaphragm 5 including the second dielectric film 12, the upper electrode 6, and the silicon nitride film 13 are formed and the corrugated region 5*a* is formed to the outer periphery of the diaphragm 5. Then, the second dielectric film 12 and the silicon nitride film 13 at a predetermined portion where the upper electrode 6 is not formed are etched by using a resist pattern formed by a photolithographic method as a mask to open etching holes (not illustrated).

Figure 9:
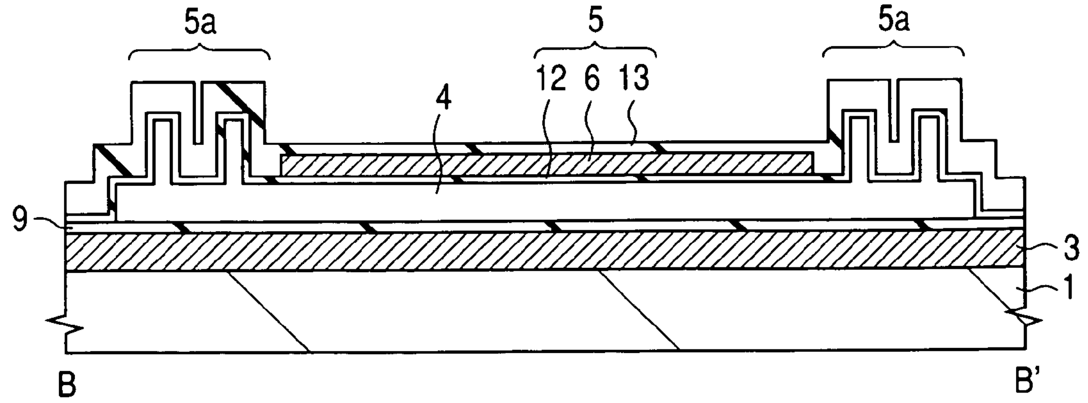
FIG. 9 is a cross sectional view for a principal portion along line B-B' in FIG. 1, showing a manufacturing step of an ultrasonic oscillator according to Embodiment 1 of the invention.

Then, as shown in FIG. 9, the first and the second sacrificial layer patterns 10, 11 are removed by the wet etching method, to form a cavity 4. Then, although not illustrated, a silicon nitride film (or silicon dioxide film) is deposited above the silicon nitride film 13 to seal the etching holes. Optionally, surplus portion of the silicon nitride film (or silicon dioxide film) for sealing the etching holes is removed. With the manufacturing steps described above, the ultrasonic oscillator M1 shown in FIG. 1 and FIG. 2 is substantially completed.

The planar shape, the cubic shape, and the size of the ultrasonic oscillator M1 are not restricted to those described above. For example, in the ultrasonic oscillator M1 described above, while the upper electrode 6 is formed only for the connection portion for the adjacent diaphragm 5 overriding the central portion of the cavity 4 and the corrugated region 5*a*, it may also be formed so as to cover the entire surface of the corrugated region 5*a*.

Further, the cavity 4 is not necessarily a hexagonal shape but may also be a square, octagonal, rectangular, circular, or like other shape. In this case, the shape for the first sacrificial layer pattern 10 is not restricted to the concentric shape but may also be a shape similar with the profile of the diaphragm 5. In a case where the diaphragm 5 is of a rectangular shape, by providing the corrugated structure along the longitudinal direction of the rectangular shape at the outer edge thereof, the film rigidity in the direction of the shorter axis and the direction of the longer axis can be controlled optionally. That is, in the rectangular diaphragm 5, since the film rigidity is different between the shorter axis direction and the longer axis direction, the oscillation mode in each of the directions has different resonance frequency, to result in a problem that uniform response frequency characteristic can not be obtained. However, the problem can be solved by providing the corrugated structure along the longitudinal direction to lower the resonance frequency in the direction of the shorter axis thereby making the resonance frequency in the direction of the short axis and the resonance frequency in the direction of the longer axis equal with each other. Also in a case of forming the diaphragm 5 as a rectangular shape, a convex corrugated region 5*a* is disposed in the outer side of the cavity 4 exceeding 70% for the one-half width thereof.

Further, the size of the corrugated structure can be set to an optimal value in accordance with the thickness of the diaphragm 5. Further, the manufacturing method, the material for the structure of the ultrasonic oscillator M1, etc. may be changed optionally so long as the constitution and the operation thereof can be attained.

As described above, according to Embodiment 1, substantial rigidity in the outer periphery can be made less than the rigidity in the region other than the outer periphery by forming the outer periphery of the diaphragm 5 into the corrugated structure. As a result, in a case of applying a voltage between the upper electrode 6 and the lower electrode 3, since the relatively wide region other than the outer periphery of the diaphragm 5 is attracted to the substrate 1 in a state of keeping the parallelism, an ultrasonic oscillator M1 of excellent transmission sensitivity and receiving sensitivity can be obtained.

Further, as an auxiliary effect in common with the invention, it is expected that unevenness deformation of the diaphragm 5 due to the residual stress in the film constituting the diaphragm 5 can be suppressed. This is because the stress is absorbed by the deformation of the corrugated region 5*a*.

Embodiment 2

In the ultrasonic oscillator M1 according to Embodiment 1 described above, the first and the second sacrificial layer patterns 10 and 11 are formed such that the initial cavity gap at the central portion of the diaphragm 5 in the corrugated region 5*a* is substantially identical with the cavity gap at the position where the lower electrode 3 and the upper electrode 6 are closest with each other in a case of not applying the voltage between the lower electrode 3 and the upper electrode 6. However, in the ultrasonic oscillator M2 according to Embodiment 2, the first and the second sacrificial layer patterns 10 and 11 are formed such that the initial cavity gap at the central portion of the diaphragm 5 in the corrugated region 5*a* is substantially identical with the cavity gap at the position where the lower electrode 3 and the upper electrode 6 are furthest from each other in a case of not applying the voltage between the lower electrode 3 and the upper electrode 6.

Figure 10A:
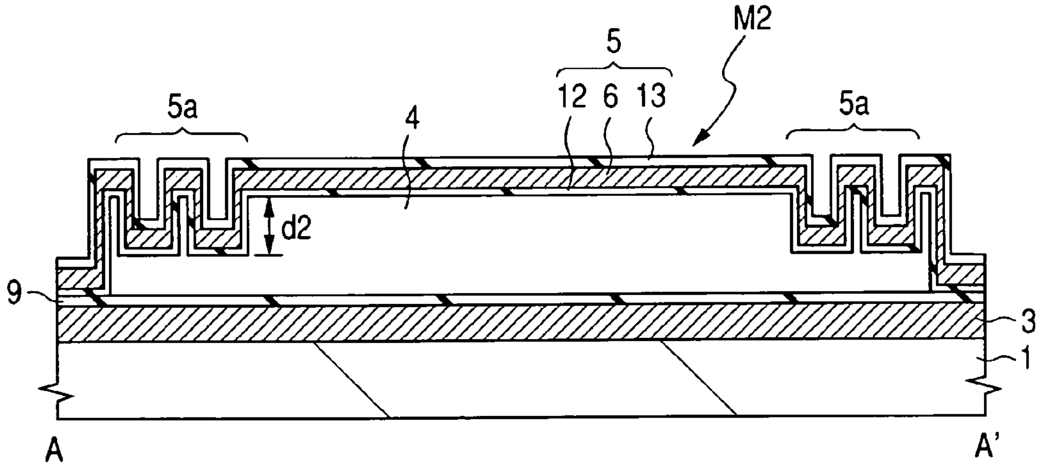
FIG. 10A, FIG. 10B, and FIG. 10C are cross sectional views for a principal portion along line A-A' in FIG. 1 of an ultrasonic oscillator according to Embodiment 2 of the invention.
Figure 10B:
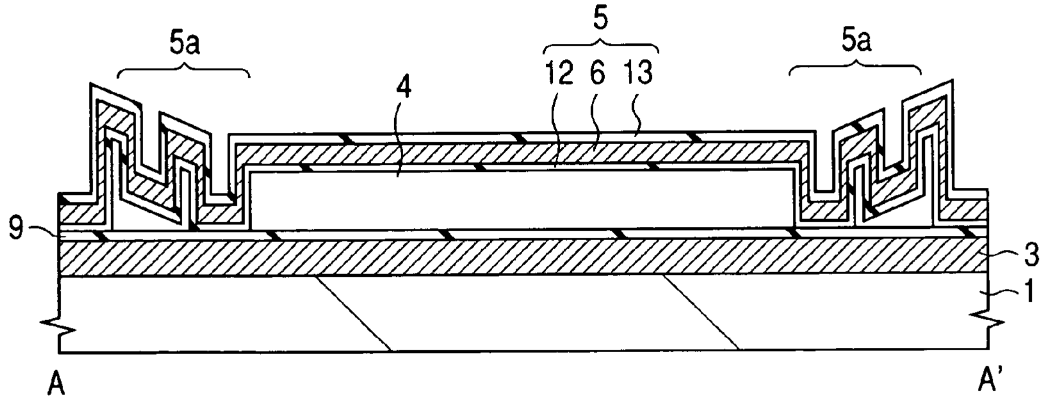
Figure 10C:
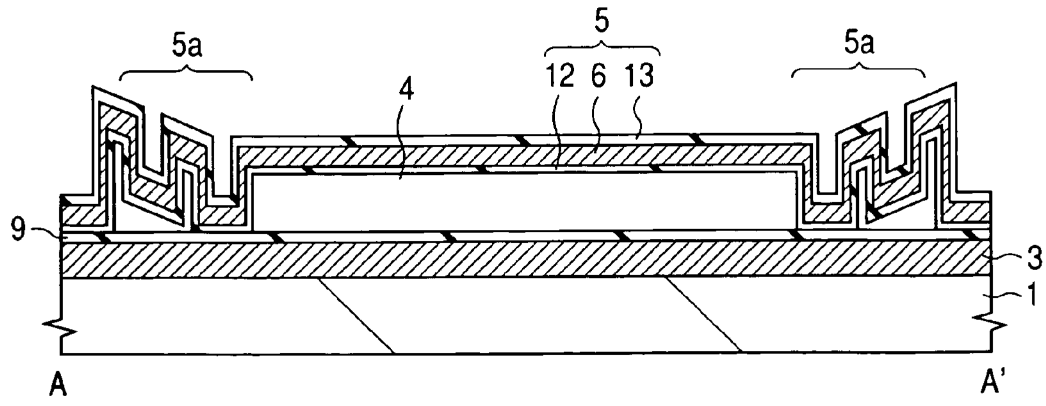

The structure of the ultrasonic oscillator constituting the ultrasonic transducer according to Embodiment 2 of the invention is to be described with reference to FIG. 10. FIG. 10 is a cross sectional view for a principal portion of an ultrasonic oscillator along line A-A' in FIG. 1 described previously.

In the ultrasonic oscillator M2 according to Embodiment 2, like the ultrasonic oscillator M1 according to Embodiment 1, since a force does not exert at all between the diaphragm 5 and the substrate 1 in a case of not applying the voltage between the lower electrode 3 and the upper electrode 6 (FIG. 10A), the diaphragm 5 is substantial in parallel with the substrate 1.

In a case of applying a DC voltage between the lower electrode 3 and the upper electrode 6 (FIG. 10B), the diaphragm 5 is attracted to the substrate 1 and the innermost concave portion of the corrugated region 5*a* is in contact with the first dielectric film 9 above the substrate 1. However, since a region further inside thereof has no corrugated structure, it has a high rigidity and is not distorted largely even when the diaphragm 5 is attracted to the substrate 1 by the electrostatic force. That is, the cavity gap at the central portion of the diaphragm 5 can be kept relatively constant. Accordingly, the area density of electric charges induced on the lower electrode 3 and the upper electrode 6 is made uniform, and the attraction exerting between the charges on the lower electrode 3 and the charges on the upper electrode 6 is also made relatively constant.

In a case of applying an AC voltage being superposed on the DC voltage between the lower electrode 3 and the upper electrode 6 (FIG. 10C), since the force exerted between the charges on the lower electrode 3 and charges on the upper electrode 6 opposed to each other fluctuates, the attraction between the diaphragm 5 and the substrate 1 increases or decreases to oscillate the diaphragm 5 and generate ultrasonic waves.

Figure 11:
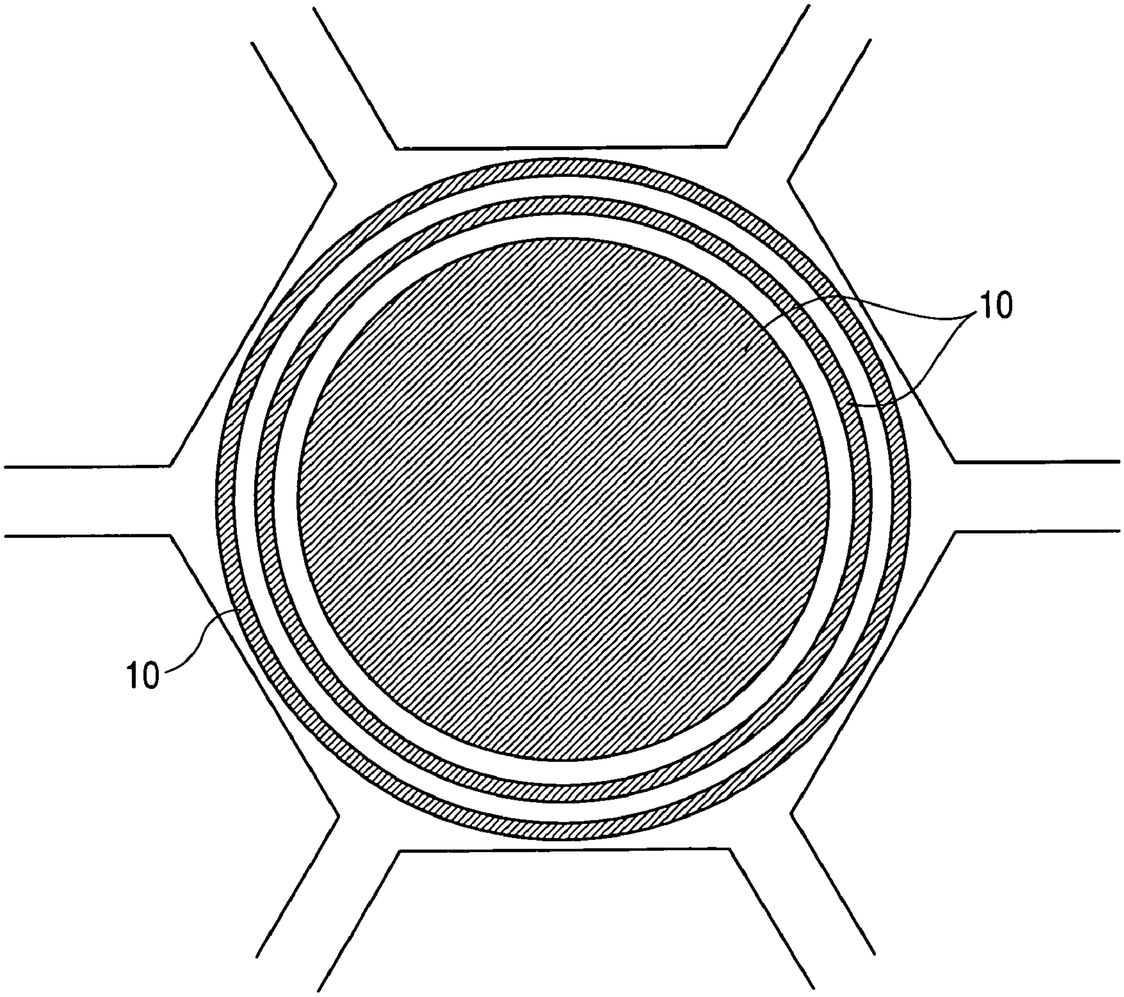
FIG. 11 is a plan view for a principal portion of a first sacrificial layer pattern according to Embodiment 2 of the invention.

The method of manufacturing the ultrasonic transducer according to Embodiment 2 of the invention is substantially identical with the method of manufacturing the ultrasonic oscillator M1 according to Embodiment 1 described previously. However, it is necessary to change the thickness of the first and the second sacrificial layer patterns 10 and 11 and the planar pattern shape of the first sacrificial layer pattern 10. The thickness for the first sacrificial layer pattern 10 is made, for example, to about 30 to 200 nm and the thickness of the second sacrificial layer pattern 11 is made, for example, to about 20 to 100 nm. Further, the planar pattern shape of the first sacrificial layer pattern 10 is, for example, a pattern inverted from the first sacrificial layer pattern 10 according to Embodiment 1 described previously, which is a circular shape having a concave portion as shown in FIG. 11.

As described above according to Embodiment 2, the initial cavity gap at the central portion of the diaphragm 5 in a case of not applying the voltage between the lower electrode 3 and the upper electrode 6 is determined depending on the thickness of the first and the second sacrificial layer patterns 10 and 11 but, since the cavity gap at the central portion of the diaphragm 5 in a case of applying the voltage between the lower electrode 3 and the upper electrode 6 is determined depending on the height d2 for the concave portion (thickness of the first sacrificial layer pattern 10), the second sacrificial layer pattern 11 can be formed to a relatively large thickness. This can increase the initial cavity gap and improve the yield of the cavity 4 in the manufacturing process. That is, in a case where the initial cavity gap is small, it may be a possibility that the diaphragm 5 is bonded to the substrate 1 due to the capillary force at the gas/liquid interface upon removing the first and the second sacrificial layer patterns 10 and 11 by weight etching. However, in the ultrasonic oscillator M2 as the Second Embodiment 2, since the initial cavity gap can be increased, such possibility can be avoided.

Further, even when the initial cavity gap is made larger, a small cavity gap (for example, about from 10 to 30 nm) can be obtained stably during driving. Accordingly, since the cavity gap during driving can be made be small, high transmission sensitivity and receiving sensitivity can be obtained even at a low voltage and, accordingly, the driving voltage for the ultrasonic transducer can be lowered.

Embodiment 3

The manufacturing process used in Embodiment 1 and Embodiment 2 described above belongs to a category of a so-called semiconductor integrated circuit production process, and the ultrasonic oscillators M1, M2 can be manufactured by a semiconductor integrated circuit production process, for example, by the production process for field effect transistors. Accordingly, the ultrasonic oscillators M1, M2 described above can easily be integrated monolithically with semiconductor integrated circuits.

In Embodiment 3, description is to be made to an example of forming an ultrasonic oscillator M1 according to Embodiment 1 described above on a substrate identical with that for a semiconductor integrated circuit. Since the ultrasonic oscillator M1 has less rigidity in the periphery of the diaphragm compared with the ultrasonic oscillator not provided with the corrugated region, it can be operated at a relatively voltage. Accordingly, this provides an advantage that a semiconductor integrated circuit of so high withstanding voltage is not necessarily be used for the driving. In the same manner as in the ultrasonic oscillator M1, it will be apparent that the ultrasonic oscillator M2 according to Embodiment 2 can be formed on the substrate identical with that for the integrated circuit.

At first, a multiplexer including selection switch arrays by the number of N arranged in a 2-dimensional manner is manufactured by using a production process for high withstanding voltage CMOS (Complementary Metal Oxide Semiconductor) device. Then, independent ultrasonic oscillators by the number of N (or assembly of ultrasonic oscillators) are formed on each of the selection switch arrays. In the multiplexer, independent ultrasonic oscillators by the number of N (or assembly of ultrasonic oscillators) are bundled into groups by the number of M and each of them is coupled with an input line and an output line by the number of M. The spatial distribution of the ultrasonic oscillators (or assembly of ultrasonic oscillators) bundled into one group in the oscillator array can be set optionally. That is, an oscillator array including independent ultrasonic oscillators (or assembly of ultrasonic oscillators) by the number of N behaves as ultrasonic oscillators by the number of M optionally bundled spatially. Since this can optionally set the spatial distribution of the phase of ultrasonic waves generated from the oscillator array, ultrasonic waves can be converged to any point. Further, since the input/output lines can be decreased to the number of M relative to the vibration arrays, the device can be miniaturized in the size.

In addition to the multiplexer, a driving circuit for the ultrasonic oscillator or an amplifier circuit for ultrasonic wave receiving signals can be formed on one identical substrate.

Embodiment 4

In the ultrasonic oscillator M1 according to Embodiment 1 described above, the initial cavity gap at the central portion of the diaphragm 5 and the cavity gap at the position in the corrugated region 5*a* where the lower electrode 3 and the upper electrode 6 are nearest with each other are set substantially identical when the voltage is not applied between the lower electrode 3 and the upper electrode 6, and the DC voltage is applied to attract the diaphragm 5 to the substrate 1 within a range where the central portion of the diaphragm 5 is not in contact with the first dielectric film 9 above the substrate 1, and the AC voltage is superposed to generate ultrasonic waves. In Embodiment 4, a dimple is further added to the inside of the corrugated region 5*a* and at the outermost edge for the central portion of the diaphragm 5 to stabilize the cavity gap.

Figure 12A:
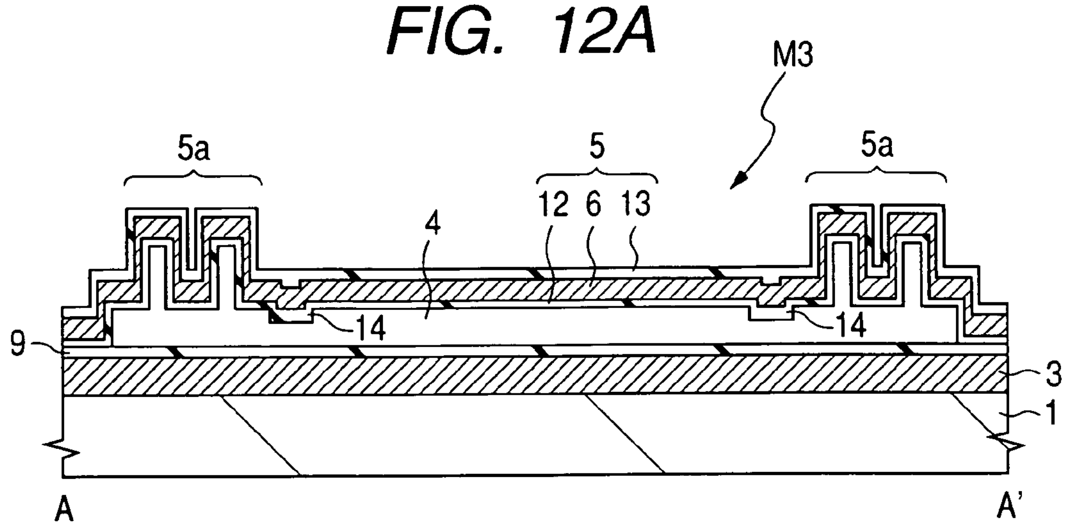
FIG. 12A, FIG. 12B, and FIG. 12C are cross sectional views for a principal portion along line A-A' in FIG. 1 of an ultrasonic oscillator according to Embodiment 4 of the invention.
Figure 12B:
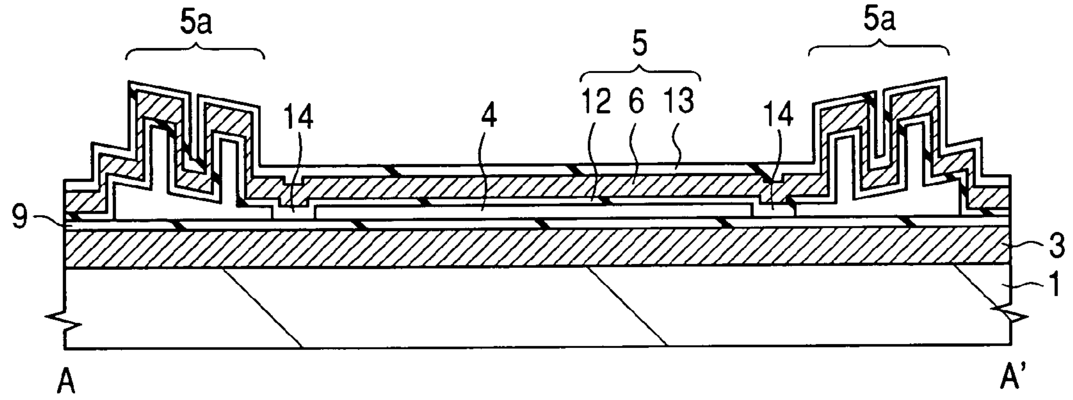
Figure 12C:
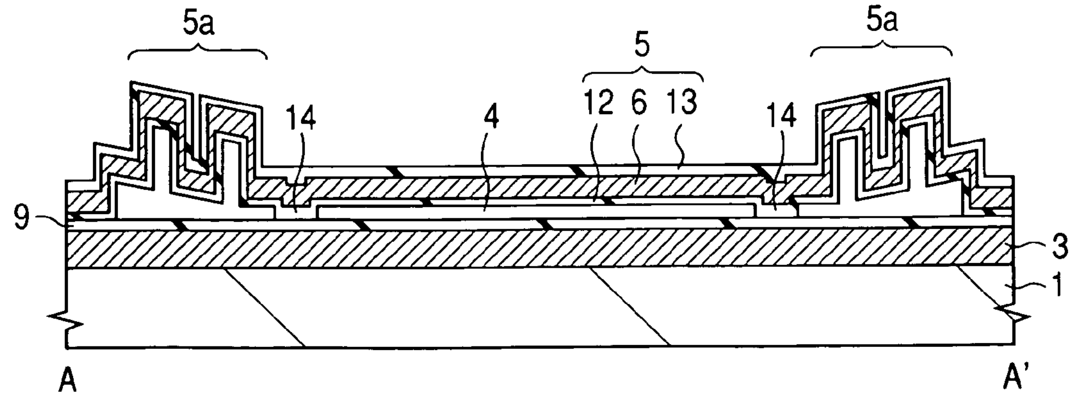

The structure of the ultrasonic oscillator constituting the ultrasonic transducer according Embodiment 4 of the invention is to be described with reference to FIG. 12A to FIG. 12C. FIG. 12A to FIG. 12C are cross sectional views for a principal portion of an ultrasonic oscillator along line A-A' in FIG. 1 described above.

In the same manner as in the ultrasonic oscillator M1 according to Embodiment 1 described above, in the ultrasonic oscillator M3 according to Embodiment 4, since a force does not exert at all between the diaphragm 5 and the substrate 1 in a case of not applying a voltage between a lower electrode 3 and an upper electrode 6 (FIG. 12A), the diaphragm 5 is substantially a parallel with the substrate 1.

When a DC voltage is applied between the lower electrode 3 and the upper electrode 6 (FIG. 12B), the diaphragm 5 is attracted to the substrate 1. Since the outer periphery of the diaphragm 5 has a corrugated region 5*a* of less rigidity compared with the central portion, the diaphragm is bent greatly at the outer periphery, while the central portion is attracted to the substrate 1 while being kept relatively parallel. In this case, a dimple 14 disposed to the inside of the corrugated region 5*a* and at the outermost edge for the central portion of the diaphragm 5 is in contact with the first dielectric film 9 above the substrate 1. As a result, the cavity gap is defined depending on the height of the dimple 14. Since the central portion of the diaphragm 5 has a large rigidity, further application of AC voltage does not cause pull-in, etc.

Then, a method of manufacturing the ultrasonic oscillator M3 described above is to be described in the order of steps with reference to FIG. 13 to FIG. 17. FIG. 13 to FIG. 17 are cross sectional views for a principal portion of an ultrasonic oscillator along line B-B' in FIG. 1 described above.

Figure 13:
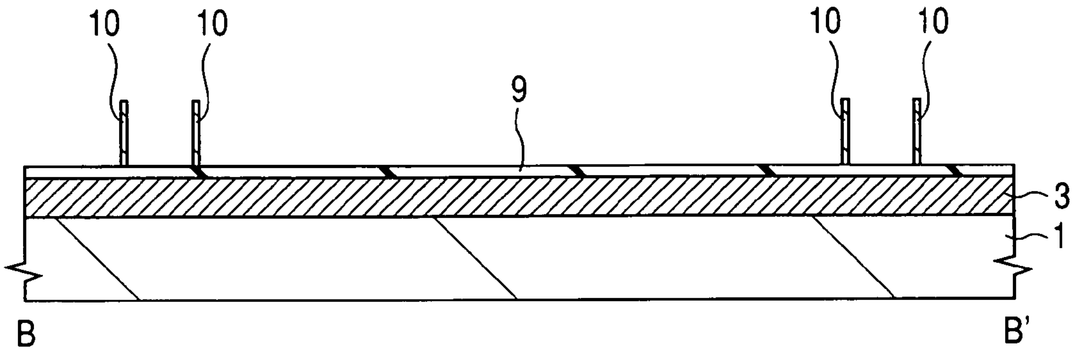
FIG. 13 is a cross sectional view for a principal portion along line B-B' in FIG. 1 showing a manufacturing step of an ultrasonic oscillator according to Embodiment 4 of the invention.
Figure 14:
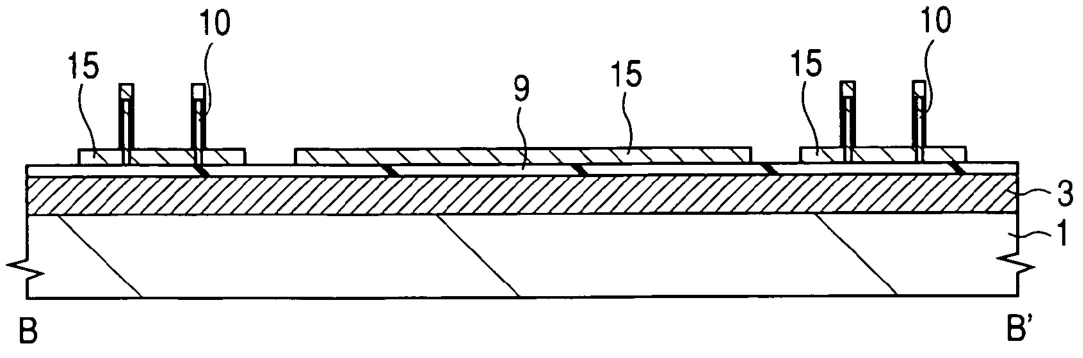
FIG. 14 is a cross sectional view for a principal portion along line B-B' in FIG. 1 showing a manufacturing step of an ultrasonic oscillator according to Embodiment 4 of the invention.

At first, as shown in FIG. 13, in the same manner as in Embodiment 1 described above, a lower electrode 3 and a first dielectric film 9 are formed above a substrate 1 and, further, a first sacrificial layer pattern 10 is formed in a region to form a corrugated convex portion. Then, as shown in FIG. 14, after depositing a third sacrificial layer, for example, a polycrystal silicon film above the first sacrificial layer pattern 10 by a CVD method, the third sacrificial layer is etched by using a resist pattern formed by a photolithographic method as a mask to form a third sacrificial layer pattern 15 except for a region in which the dimple 14 is to be formed later (for example, a circular region having a center identical with the center for the first sacrificial layer pattern 10, from which a portion positioned inside of the first sacrificial layer pattern 10 is removed in a doughnuts shape.

Figure 15:
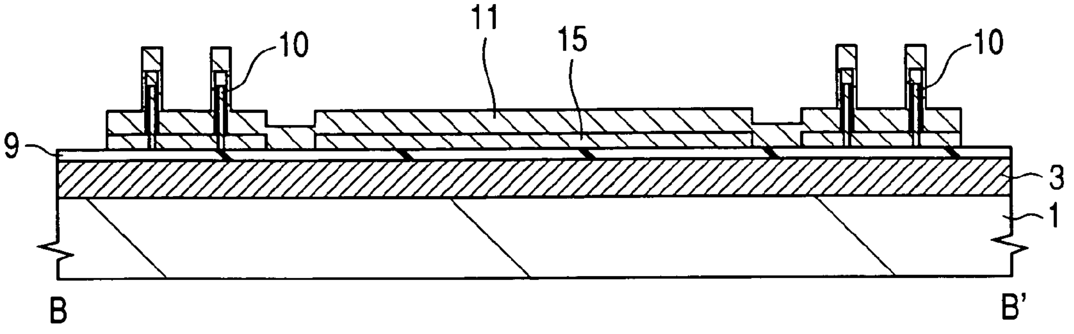
FIG. 15 is a cross sectional view for a principal portion along line B-B' in FIG. 1 showing a manufacturing step of an ultrasonic oscillator according to Embodiment 4 of the invention.

Then, as shown in FIG. 15, after depositing a second sacrificial layer, for example, a polycrystal silicon film above the third sacrificial layer pattern 15 by a CVD method, the second sacrificial layer is etched by using a resist pattern formed by a photolithographic method as a mask to form a second sacrificial layer pattern 11 in a region where a cavity 4 is to be formed subsequently.

Figure 16:
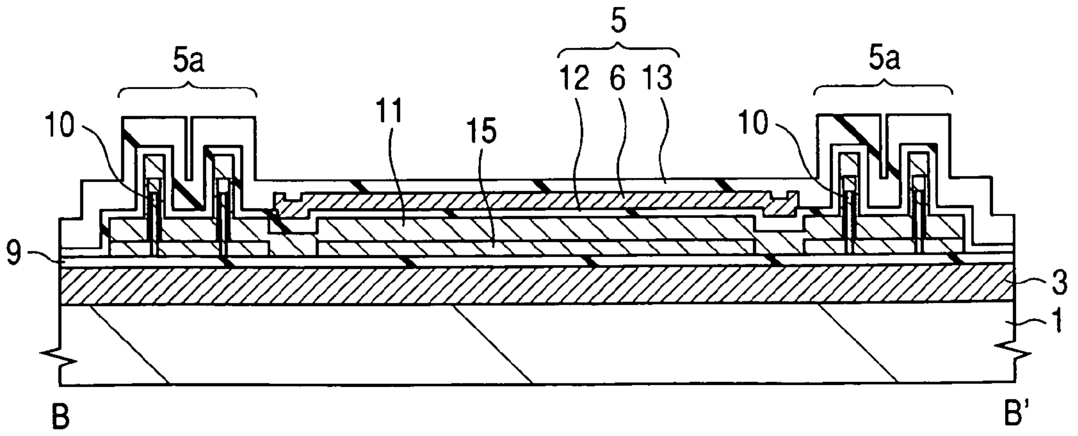
FIG. 16 is a cross sectional view for a principal portion along line B-B' in FIG. 1 showing a manufacturing step of an ultrasonic oscillator according to Embodiment 4 of the invention.
Figure 17:
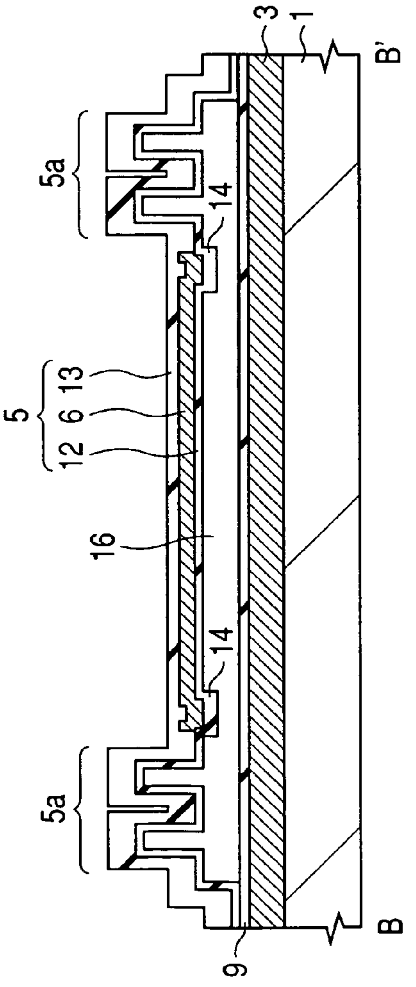
FIG. 17 is a cross sectional view for a principal portion along line B-B' in FIG. 1 showing a manufacturing step of an ultrasonic oscillator according to Embodiment 4 of the invention.

Then, as shown in FIG. 16, in the same manner as in Embodiment 1 described above, after depositing a second electric film 12 above the second sacrificial layer pattern 11, an upper electrode 6 is formed and, further, a diaphragm 5 and a corrugated region 5*a* are formed by covering the upper electrode 6 with a silicon nitride film 13. Then, as shown in FIG. 17, in the same manner as in Embodiment 1 described above, the first, second and third sacrificial layer patterns 10, 11, and 15 are removed by a wet etching method to form a cavity 16 having a corrugated structure and a dimple 14. In a case where the planar shape of the cavity 16 is circular, the planar shape of dimple 14 is preferably a doughnuts shape. In a case where the planar shape of the cavity 16 is rectangular, the planar shape of the dimple 14 can be changed variously.

In Embodiments 1 to 4 described above, since the area of the corrugated region 5*a* is in proportion with the diameter and the effective region area contributing to transmission/receiving of the ultrasonic wave is in proportion with the square of the diameter, the effectiveness of the invention is improved more as the diameter of the diaphragm 5 is larger. While the diaphragm 5 may possibly be fractured by the film stress of the diaphragm 5 when the diameter of the diaphragm 5 is larger, since the film stress of the diaphragm 5 is absorbed by the corrugated region 5*a* in the invention, the diaphragm is not fractured. Further, in a case of setting the initial cavity gap smaller for conducting low voltage driving, this may possibly increase the potential that the diaphragm 5 is bonded to the substrate 1 by the capillary force. However, such a problem can be avoided in the invention since the initial cavity gap can be set relatively larger.

Embodiment 5

Figure 18:
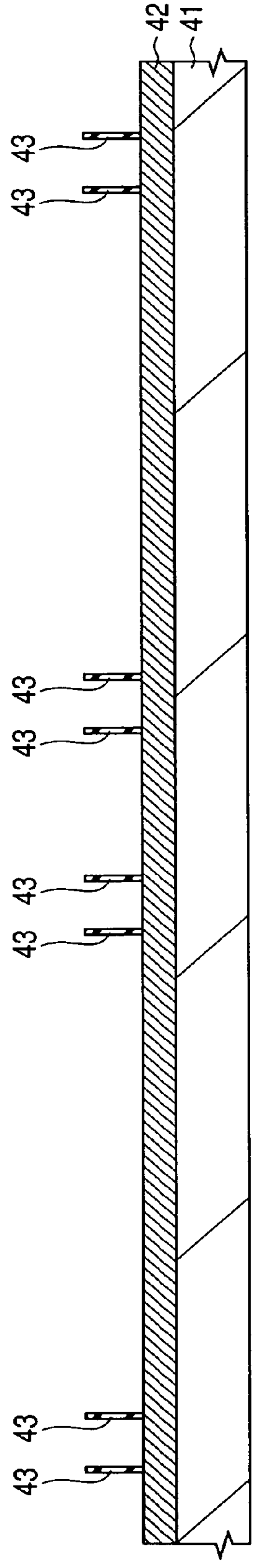
FIG. 18 is a cross sectional view for a principal portion showing a step of manufacturing an ultrasonic oscillator according to Embodiment 5 of the invention.
Figure 19:
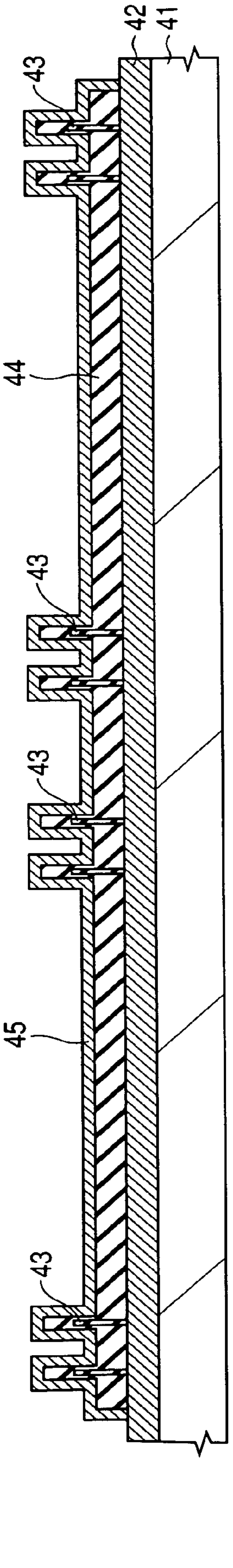
FIG. 19 is a cross sectional view for a principal portion showing a step of manufacturing an ultrasonic oscillator according to Embodiment 5 of the invention.
Figure 20:
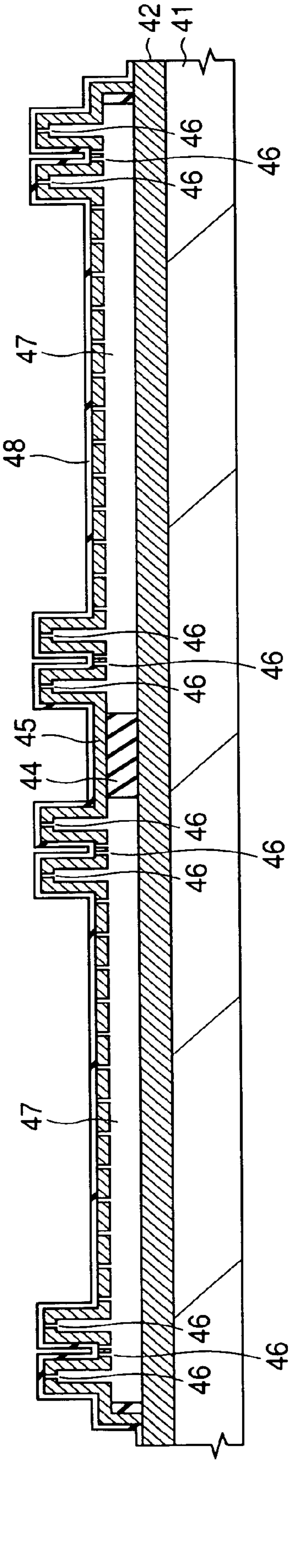
FIG. 20 is a cross sectional view for a principal portion showing a step of manufacturing an ultrasonic oscillator according to Embodiment 5 of the invention.

A manufacturing method and a structure of an ultrasonic oscillator constituting an ultrasonic transducer according to Embodiment 5 of the invention are to be described with reference to FIG. 18 to FIG. 20. FIG. 18 to FIG. 20 are cross sectional views for a principal portion schematically showing steps of manufacturing two ultrasonic oscillators according to Embodiment 5 of the invention.

At first, as shown in FIG. 18, a conductor film, for example, a tungsten film formed on a substrate 41 is etched by using a resist pattern formed by a photolithographic method as a mask to form a lower electrode 42. Successively, after depositing a first dielectric film above the lower electrode 42 by a plasma CVD method, the first dielectric film is etched by using a resist pattern formed by a photolithographic method as a mask to form a first dielectric film pattern 43 having one or more linear convex portions in a region to form a corrugated structure. The first dielectric film pattern 43 is disposed to the outer edge along a longitudinal edge in a region to form a rectangular cavity.

Then, as shown in FIG. 19, after depositing a second dielectric film (for example, silicon dioxide film) 44 above the lower electrode 42 and the first dielectric film pattern 43 by a plasma CVD method, a second tungsten film 45 is formed above the second dielectric film 44 by using a sputtering method and, further, the second tungsten film 45 is etched using a resist pattern formed by a photolithographic method as a mask to form a pattern 46 micro holes each of about 250 nm diameter arranged at a predetermined pitch in a region to form a rectangular cavity. For forming the micro hole pattern 46, exposure technology by an i-line stepper and a hole shrinkage method using resist thermal flow technique were adopted.

Then, as shown in FIG. 20, the first dielectric film pattern 43 and the second dielectric film 44 in the vicinity below the micro hole pattern 46 were isotropically removed by etching using fluoric acid in gas phase (HF vapor), to form a rectangular cavity 47. Successively, the cavity 47 is sealed by depositing a silicon oxide film 48 by a thermal CVD method to seal the micro hole pattern 46 and, further, a silicon nitride film (not illustrated) is deposited. Since the silicon oxide film 48 is deposited also to the inner wall of the cavity 47 till the micro hole pattern 46 is closed, the upper electrode and the lower electrode are not in direct contact with each other even when the cavity 47 deforms. The dielectric film may be formed also after forming the lower electrode 42 and, in this case, it is preferred to form a dielectric film having favorable withstanding voltage characteristic and relatively high dielectric constant and with less etching rate to hydrofluoric acid. Further, while the ultrasonic oscillator according to Embodiment 5 has been formed as a convex corrugated structure like Embodiment 1 described above, it may be a concave corrugated structure like Embodiment 2 described above. In a case of forming the concave corrugated structure, a first dielectric film pattern 43 having one or more linear concave portions are formed to a region forming the corrugated structure.

As described above, according to Embodiment 5, since the resonance frequency in the direction of the shorter axis is decreased and is substantially identical with the resonance frequency in the direction of the longer axis by forming the corrugated structure along the longitudinal direction, spurious which is deleterious in view of the ultrasonic oscillation characteristic can be suppressed. Further, since a large distance can be obtained between the upper electrode and the lower electrode in a region between two neighboring ultrasonic oscillators, it is excellent in view of parasitic capacitance and dielectric withstanding voltage are excellent and since the upper electrode has an extremely planar structure, it is excellent in the reliability. Further, by using a low temperature process such as a sputtering method or a plasma CVD method (process temperature, 500° C. or lower) for the production process, it can be formed relatively easy also above LSI in which aluminum wirings are formed and, accordingly, it is also suitable to formation of a probe matrix above LSI as described for Embodiment 3.

While the invention made by the present inventor has been described specifically based on the preferred embodiments, the invention is not restricted to the embodiments described above and it will be apparent that various modifications are possible within a range not departing the gist thereof.

The ultrasonic oscillator of the invention can be utilized, for example, to various medical diagnostic equipments, and defect inspection apparatus for the inside of machines using ultrasonic transducers, various imaging equipment systems by ultrasonic waves (detection of obstacles, etc.), position detection systems, temperature distribution measuring systems, etc.

What is claimed is:

1. An ultrasonic transducer having a plurality of ultrasonic oscillators arranged on one identical substrate, wherein the ultrasonic transducer includes a lower electrode fixed to the substrate, a diaphragm opposed to the substrate with a cavity being put therebetween, and an upper electrode disposed to the diaphragm, and wherein the diaphragm has a corrugated structure in an outer region of the cavity exceeding 70% for the radius or one-half width thereof.

2. The ultrasonic transducer according to claim 1, wherein the corrugated structure has a concentric convex shape having a center identical with the center for the diaphragm or a convex shape similar with the profile of the diaphragm.

3. The ultrasonic transducer according to claim 2, wherein a cavity gap at the central portion of the diaphragm and a cavity gap in a region of the diaphragm having the corrugated structure where the upper electrode and the lower electrode are closest with each other are substantially identical when a voltage is not applied between the upper electrode and the lower electrode.

4. The ultrasonic transducer according to claim 2, wherein the cavity gap at the central portion of the diaphragm when a voltage is not applied between the upper electrode and the lower electrode is from 50 to 100 nm.

5. The ultrasonic transducer according to claim 2, wherein a dielectric film is formed between the lower electrode and the cavity and between the upper electrode and the cavity, respectively.

6. The ultrasonic transducer according to claim 2, wherein the diaphragm further has a dimple to the inside of the region having the corrugated structure.

7. The ultrasonic transducer according to claim 6, wherein the dimple is in a doughnuts structure having a center identical with the center for the diaphragm.

8. The ultrasonic transducer according to claim 1, wherein the corrugated structure has a concentric concave shape having center identical with the center for the diaphragm or a concave shape similar with the profile of the diaphragm.

9. The ultrasonic transducer according to claim 8, wherein a cavity gap at the central portion of the diaphragm and a cavity gap in a region of the diaphragm having the corrugated structure where the upper electrode and the lower electrode are furthest from each other are substantially identical when a voltage is not applied between the upper electrode and the lower electrode.

10. The ultrasonic transducer according to claim 8, wherein the cavity gap at the central portion of the diaphragm when a voltage is not applied between the upper electrode and the lower electrode is from 50 to 100 nm.

11. The ultrasonic transducer according to claim 8, wherein a dielectric film is formed between the lower electrode and the cavity and between the upper electrode and the cavity, respectively.

12. The ultrasonic transducer according to claim 1, wherein a multiplexer is formed above the substrate in which an oscillator array comprises a plurality of ultrasonic oscillators or an oscillator array comprises an assembly of a plurality of ultrasonic transducers.

* * * * *